(12) United States Patent
Doerr et al.

(10) Patent No.: US 7,733,562 B2
(45) Date of Patent: Jun. 8, 2010

(54) OPTICAL EQUALIZATION OF MULTI-LEVEL SYMBOL CONSTELLATIONS

(75) Inventors: Christopher Doerr, Middletown, NJ (US); Alan Gnauck, Middletown, NJ (US); Gregory Raybon, Shrewsbury, NJ (US); Peter Winzer, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 164 days.

(21) Appl. No.: 11/772,110

(22) Filed: Jun. 29, 2007

(65) Prior Publication Data
US 2008/0231944 A1 Sep. 25, 2008

Related U.S. Application Data

(60) Provisional application No. 60/919,696, filed on Mar. 23, 2007.

(51) Int. Cl.
*H04B 10/158* (2006.01)
*H04B 10/06* (2006.01)
*H04B 10/12* (2006.01)

(52) U.S. Cl. .................. 359/337.1; 398/208; 398/211; 398/214; 375/234; 375/235; 375/308

(58) Field of Classification Search .............. 359/337.1; 375/234, 235, 308; 398/208, 211, 214
See application file for complete search history.

(56) References Cited

U.S. PATENT DOCUMENTS 6,067,180 A * 5/2000 Roberts ...................... 398/201

| | | | |
|---|---|---|---|
| 6,982,939 B2 * | 1/2006 | Powelson et al. ......... | 369/47.53 |
| 7,161,980 B2 * | 1/2007 | Dittrich et al. ............. | 375/233 |
| 2002/0126604 A1 * | 9/2002 | Powelson et al. ......... | 369/47.53 |
| 2002/0167693 A1 * | 11/2002 | Vrazel et al. ................ | 359/109 |
| 2004/0032905 A1 * | 2/2004 | Dittrich et al. ............. | 375/233 |
| 2006/0232848 A1 * | 10/2006 | Xu et al. ..................... | 359/325 |
| 2007/0206898 A1 * | 9/2007 | Wang et al. .................. | 385/24 |
| 2008/0240736 A1 * | 10/2008 | Ji et al. ....................... | 398/202 |

OTHER PUBLICATIONS

Griffin et al., "Optical differential quadrature phase-shift key (oDQPSK) for high capacity optical transmission", Optical Fiber Communication Conference and Exhibit, pp. 367-368 (Mar. 17-22, 2002).*
Winzer et al. ("107-Gb/s Optical Signal Generation Using Electronic Time-Division Multiplexing", Journal of Lightwave Technology, vol. 24, No. 8, pp. 3107-3113, Aug. 2006.*

* cited by examiner

*Primary Examiner*—Eric Bolda
(74) *Attorney, Agent, or Firm*—Brosemer, Kolefas & Associates

(57) ABSTRACT

A method of optically equalizing a multi-level (amplitude or phase) optical signal through the effect of an optical equalizer wherein the optical equalizer (OEQ) is placed at either a transmission end or a receiver end of the optical communications link and a tap delay characteristic of the OEQ need not be determined by symbol spacing, rather it may advantageously be adjusted to desirably compensate non-linear mapping performed in the modulation process or simultaneous operation on a plurality of wavelength division multiplexed (WDM) channels.

5 Claims, 3 Drawing Sheets

OPTICAL EQUALIZATION OF MULTI-LEVEL SYMBOL CONSTELLATIONS

CROSS-REFERENCE TO RELATED APPLICATIONS

This application claims the benefit of U.S. Provisional Patent Application No. 60/919,696 filed on Mar. 23, 2007.

FIELD OF THE INVENTION

This invention relates generally to the field of optical communications and in particular to an optical equalizer for multi-level signal formats which may be positioned at a receiving end of an optical transmission system.

BACKGROUND OF THE INVENTION

Non-binary optical symbol constellations for example, differential quadrature phase shift keying (DQPSK) formats are generated by mapping a multitude of binary electric data streams onto a single optical wavelength through the effect of an optical modulator. Unfortunately, such modulators are oftentimes bandwidth limited.

SUMMARY OF THE INVENTION

An advance is made in the art according to the principles of the present invention whereby transmitter-induced, optical modulator bandwidth limitations are mitigated by optically equalizing a multi-level (amplitude or phase) optical signal through the effect of an optical equalizer.

According to an aspect of the invention—and in sharp contrast to the teachings of the prior art and in particular binary on/off keying systems wherein an optical equalizer (OEQ) should be placed at a transmitter end of an optical communications link—optical equalization according to the present invention may be advantageously placed at either a transmission end or a receiver end of the optical communications link.

According to another aspect of the invention, a tap delay characteristic of the OEQ need not be determined by symbol spacing, rather it may advantageously be adjusted to desirably compensate non-linear mapping performed in the modulation process or simultaneous operation on a plurality of wavelength division multiplexed (WDM) channels.

BRIEF DESCRIPTION OF THE DRAWING

A more complete understanding of the present invention may be realized by reference to the accompanying drawings in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
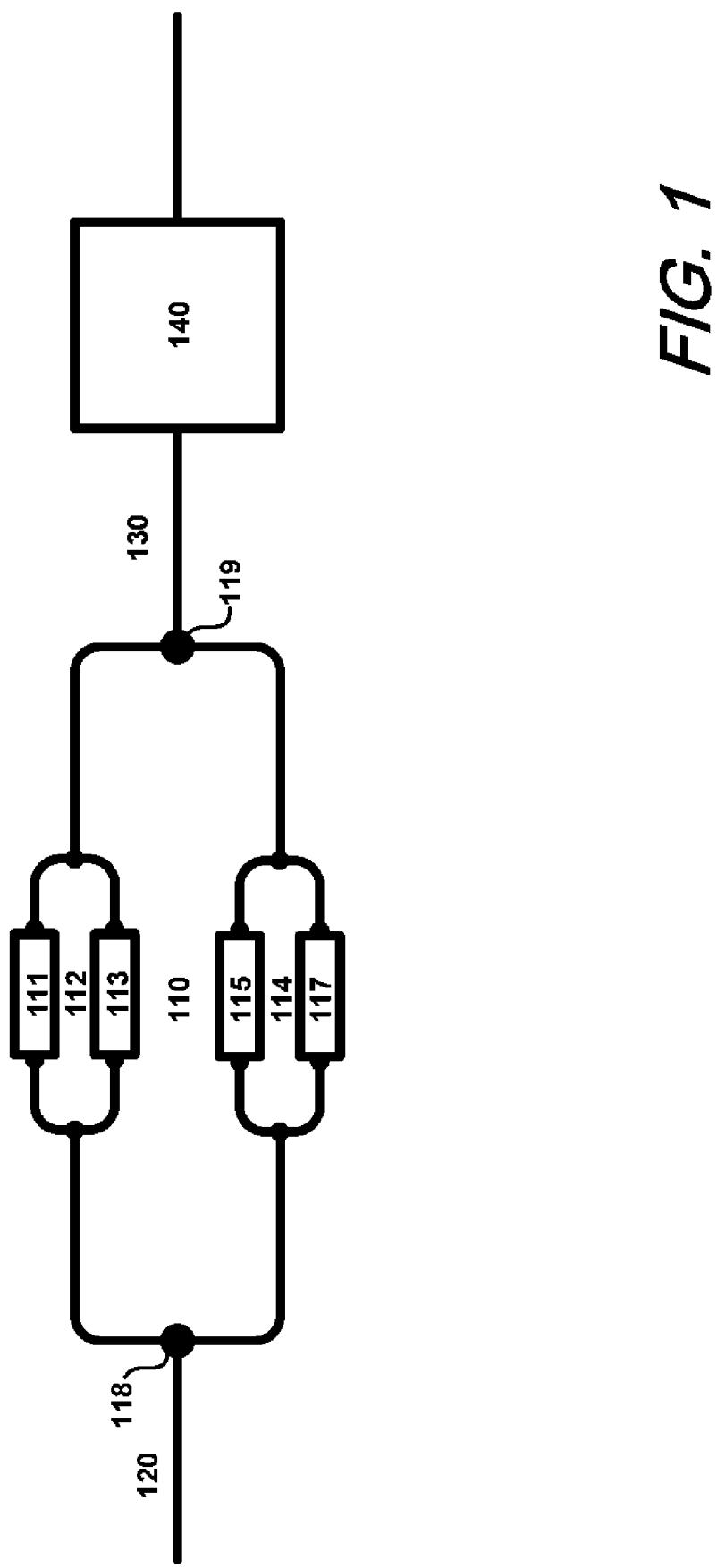
FIG. 1 is a schematic of a multi-level Mach-Zehnder modulator along with an optical equalizer according to the present invention.

With initial reference to FIG. 1, those skilled in the art will quickly recognize the well-known multi-level (nested), two-armed, Mach-Zehnder modulator 110 which receives an input optical signal from input waveguide 120 and splits that signal through the effect of splitter/coupler 118 such that the split portions are directed into the two arms of the Mach-Zehnder modulator. As can be appreciated by those skilled in the art, each of the two arms includes a separate Mach-Zehnder structure 112, 114 thereby producing the nested modulator structure. Shown in this FIG. 1, each of the nested Mach-Zehnder structures themselves include one or more phase shifters 111, 113, 115, 117 positioned within their arms. Advantageously, this modulator may produce multi-level signals such as quadrature or phase-shift keyed signals.

Modulated light produced by the nested Mach-Zehnder modulators 112, 114 is recombined through the effect of coupler 119 and subsequently output via output waveguide 130 where it is received by optical equalizer 140 and subsequently output. As noted earlier, prior art teachings dictated that the OEQ needed to be placed on a transmitter side of a transmission link—before the addition of optical noise.

Figure 2:
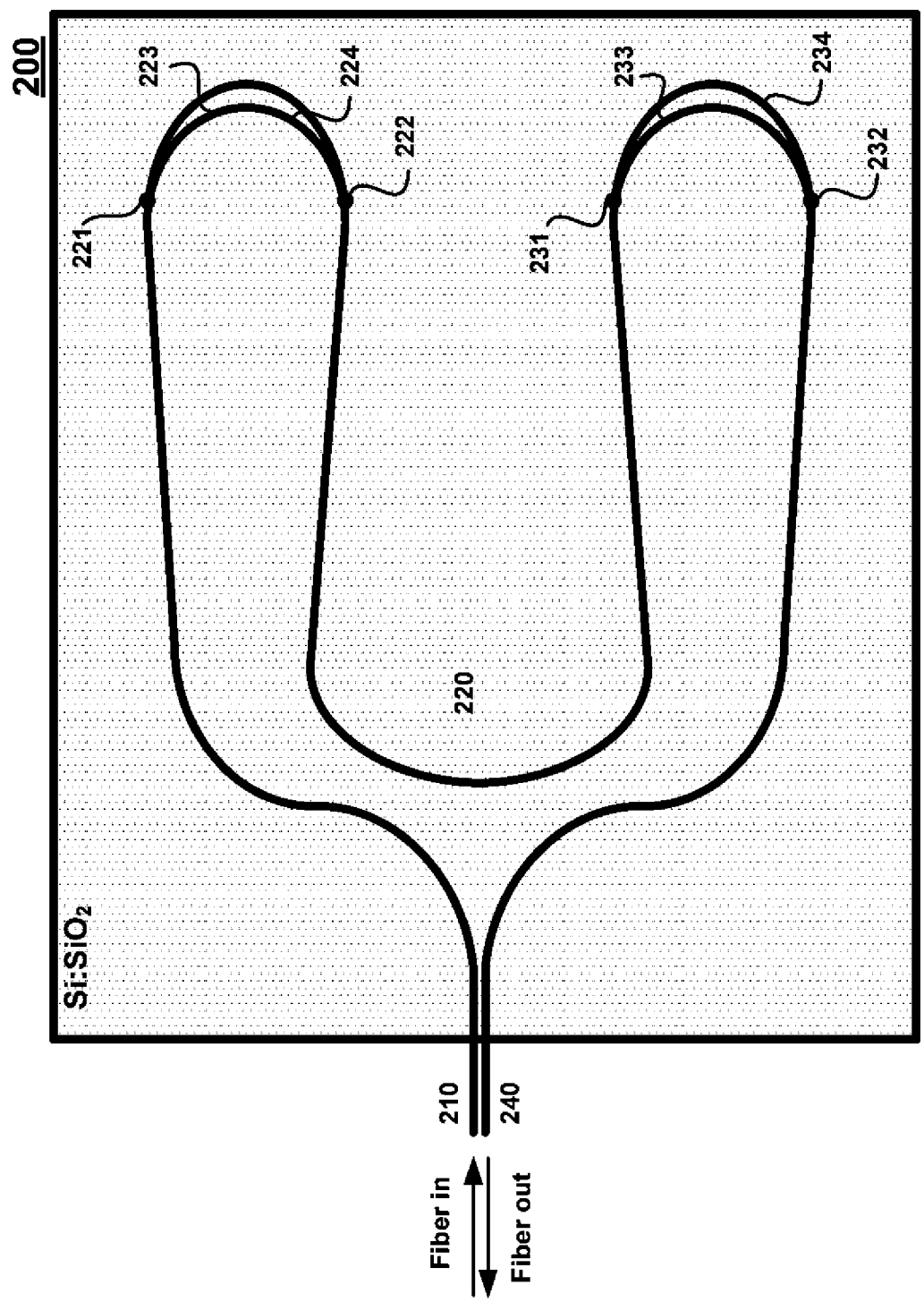
FIG. 2 is a schematic of an optical equalizer constructed on a single optical chip according to the present invention.

Turning now to FIG. 2, there is shown a schematic of an optical equalizer chip 200 constructed according to the teachings of the present invention. More particularly, optical equalizer chip 200 which may be advantageously constructed from well-understood Si:SiO$_2$ processes includes an input fiber 210, an output fiber 240 and a two-tap optical equalizer 220. As shown in this FIG. 2, the two-tap optical equalizer 220 includes a pair of cascaded Mach-Zehnder structures each having a pair of adjustable couplers 221, 222, 231, 232 and a pair of unequal length arms 223, 224, 233, 234 respectively which results in an adjustable phase within each of the two taps. Wire bond pads (not shown) permit the application of DC control voltages to the adjustable couplers which generally permits the control of the magnitude of impulses entering and exiting each of the two taps.

In a preferred embodiment, the differential delay exhibited between the two taps is substantially 0.75 T, where T is symbol period of an input signal applied to the input fiber 210 of the equalizer 200. Accordingly, for a 100G system, the differential delay for a system employing the equalizer shown in FIG. 2 would be represented by $$\frac{1}{107 \text{ Gb/s}} \cdot 0.75 = 7 \text{ ps}.$$

Notably, and according to the present invention, the equalizer tap delay as measured in time is closer to the bit period of the optical signal than its symbol period. Lastly, it is noted that while the example shown and described has involved a two tap equalizer, those skilled in the art will quickly recognize that optical equalizers having more than two taps may be used as well according to the present invention.

Advantageously, and according to a further aspect of the present invention, the optical equalization may be performed on multiple channels simultaneously. For example, consider the equalizer shown in FIG. 2, wherein a multi-wavelength, wavelength division multiplexed (WDM) signal is applied to the input fiber 210. If each of the channels present in the WDM signal applied exhibited substantially the same impairment then one optical equalizer such as that shown in FIG. 2 would compensate all of the WDM channels simultaneously if the tap time spacing was substantially equal to N/(WDM Channel Spacing).

Figure 3:
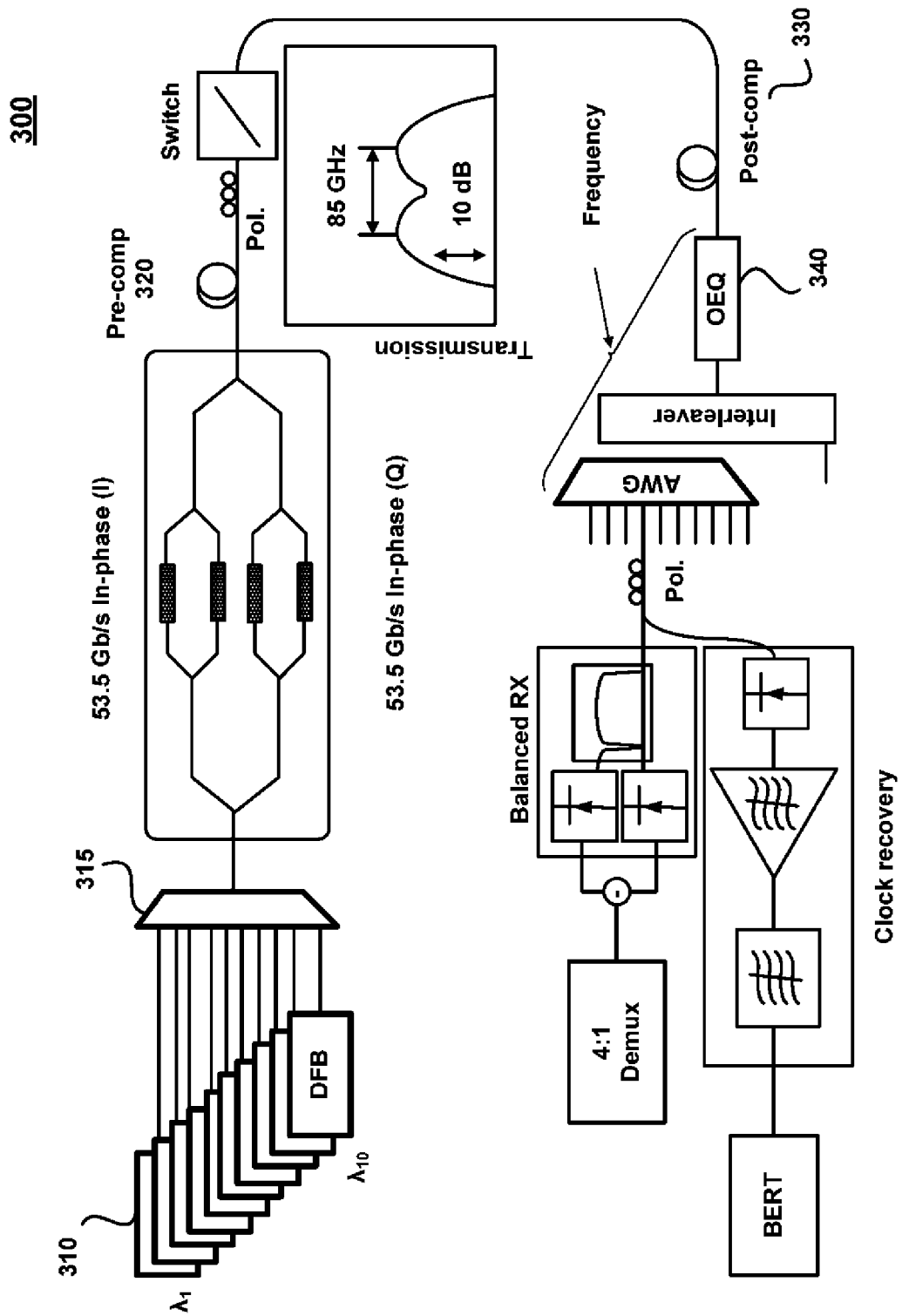
FIG. 3 is a schematic of an optical transmission system including a multi-level Mach-Zehnder modulator along with an optical equalizer according to the present invention.

With reference now to FIG. 3, there it shows an experimental setup for an optical transmission system employing optical equalization according to the present invention 300. Shown therein are ten (10) distributed feedback (DFB) lasers operating at the ITU frequency grid from 192.2 to 193.1 THz (1552 to 1560 nm) the outputs of which are combined using an arrayed waveguide grating (AWG) multiplexer 315.

All of the channels are simultaneously modulated using a double-nested LiNbO$_3$ Mach-Zehnder modulator (MZM). For the purposes of demonstration, both in-phase (I) and quadrature (Q) signals were generated by multiplexing four copies of a pseudo random bit sequence, generating a QPSK signal.

After pre-compensation, the signal was launched into a transmission span and post-compensated 330 and subsequently equalized by optical equalizer according to the present invention. As indicated by its placement in this FIG. 3, the optical equalizer 340 is positioned at the receiving end of the transmission span. Accordingly, it affects the optical signal after additional optical noise is added to the transmitted optical signal. We have shown that QPSK signals may be effectively equalized after the addition of optical noise—in sharp contrast to the prior art teachings. Those skilled in the art will recognize that equalizing at a receiving end of a transmission link is advantageous because it facilitates feedback control from the measured received signal performance—among others.

At this point, while we have discussed and described our invention using some specific examples, those skilled in the art will recognize that our teachings are not so limited. Accordingly, our invention should be only limited by the scope of the claims attached hereto.

The invention claimed is:

1. An optical equalization method comprising the steps of:
   generating a multi-level optical signal which contains inter-symbol interference;
   transmitting the generated multi-level optical signal over an optical transmission link wherein optical noise is added to the transmitted multi-level optical signal; and
   receiving the multi-level optical signal including any added noise;
   SAID METHOD CHARACTERIZED BY THE STEP OF:
   equalizing the received multi-level optical signal including the additional optical noise through the effect of an optical equalizer.

2. The method of claim 1 wherein said optical equalizer is a multi-tap equalizer exhibiting a tap spacing in time that is nearer to a bit period of the multi-level optical signal than a symbol period of that signal.

3. The method of claim 1 wherein said optical equalizer is a two-tap device exhibiting a differential delay of substantially 7 ps.

4. The method of claim 2 wherein said multi-level optical signal is a wavelength-division-multiplexed optical signal having a number of channels wherein each one of the channels is simultaneously equalized through the effect of the optical equalizer.

5. The method of claim 1, further comprising an optical filter wherein optical equalization is performed within that filter.

* * * * *